United States Patent [19]
Helmuth et al.

[11] 3,802,273
[45] Apr. 9, 1974

[54] HELICOPTER ROTOR BALANCING METHOD AND SYSTEM

[75] Inventors: James G. Helmuth, Monrovia; James R. Chadwick, Bradbury, both of Calif.

[73] Assignee: Chadwick-Helmuth Electronics, Inc., Monrovia, Calif.

[22] Filed: Oct. 17, 1972

[21] Appl. No.: 298,397

[52] U.S. Cl. .................................. 73/455, 73/466
[51] Int. Cl. ............................................. G01m 1/22
[58] Field of Search ........................ 73/455, 466, 66

[56] References Cited
UNITED STATES PATENTS

| | | | |
|---|---|---|---|
| 3,675,495 | 7/1972 | MacMillan | 73/466 |
| 2,455,053 | 11/1948 | Flint | 73/455 X |
| 2,722,830 | 11/1955 | Federn et al. | 73/463 |
| 2,090,803 | 8/1937 | Moore | 73/467 |
| 2,362,842 | 11/1944 | Mueller | 73/455 |
| 2,343,383 | 3/1944 | Martin et al. | 73/455 |

Primary Examiner—James J. Gill
Attorney, Agent, or Firm—William W. Haefliger

[57] ABSTRACT

The method of balancing a rotor having multiple blades and defining an axis of rotation, and wherein structure proximate the rotor is subject to vibratory motion due to dynamic unbalance of the rotating rotor, the method employing a vibration pickup and a stroboscope, the method including:

a. attaching the pickup to said structure, operating the pickup to produce a vibration signal which is a function of said oscillatory motion, and processing said signal to produce a corresponding oscillatory output signal, b. triggering the stroboscope in synchronism with said output signal and directing the stroboscope at the rotor to produce flashes repeatedly illuminating a target rotor blade at a characteristic angularity with respect to said axis, and c. varying the weighting of the rotor as a function of the magnitude of said signal and said characteristic angularity to achieve substantial balance.

16 Claims, 12 Drawing Figures

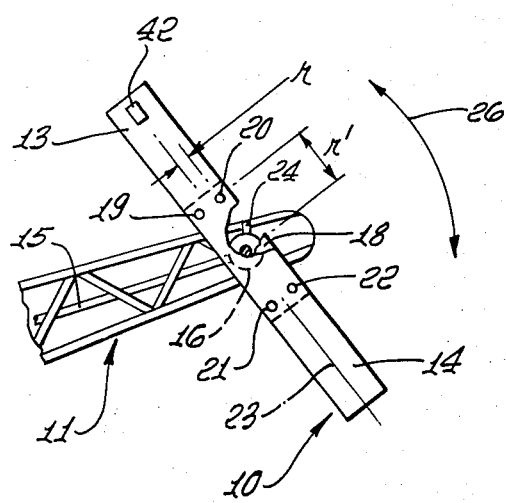
Fig. 1.
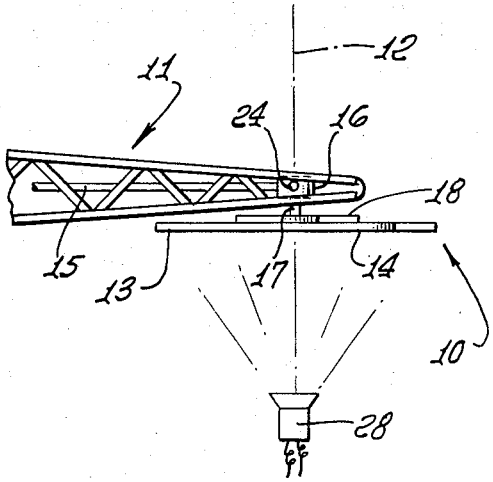
Fig. 2.
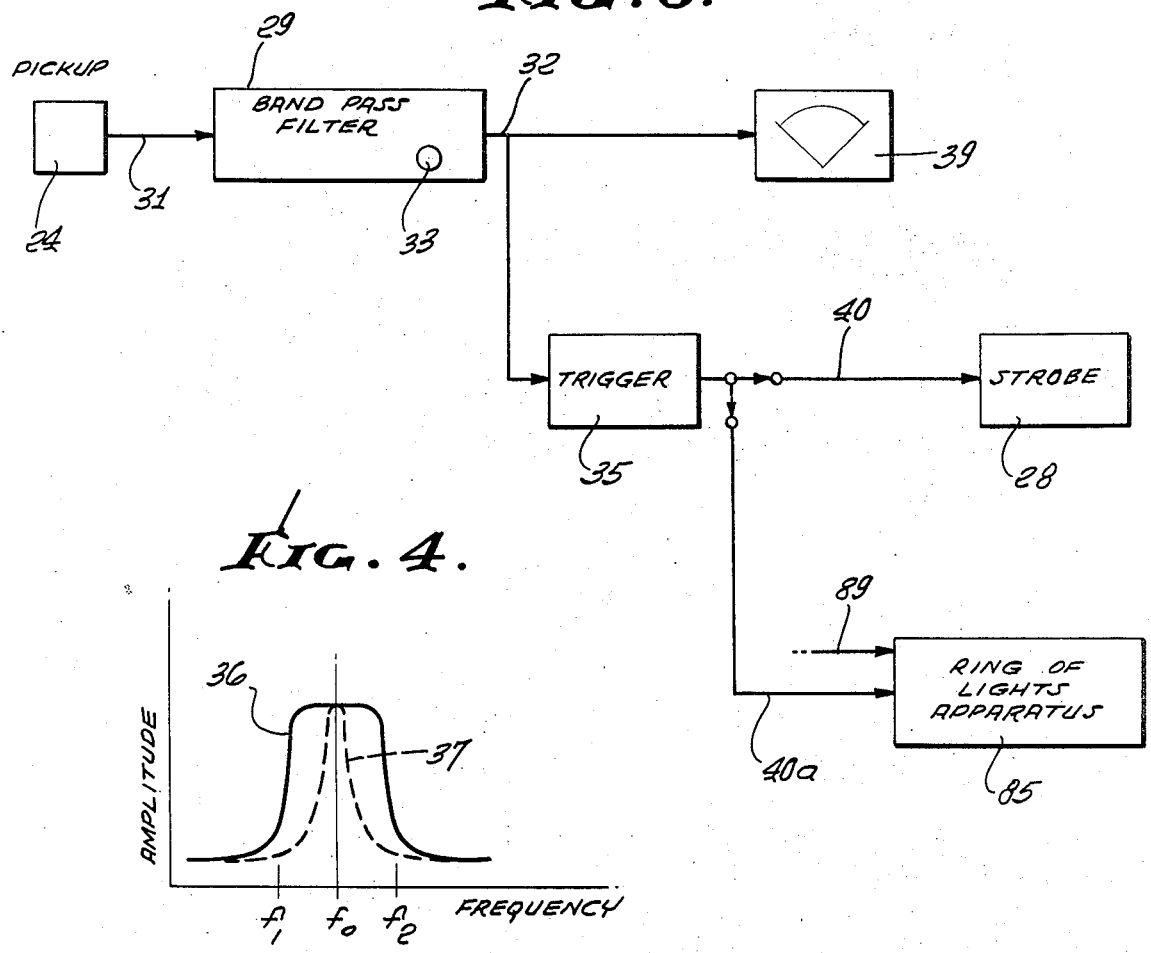
Fig. 3.
Fig. 4.

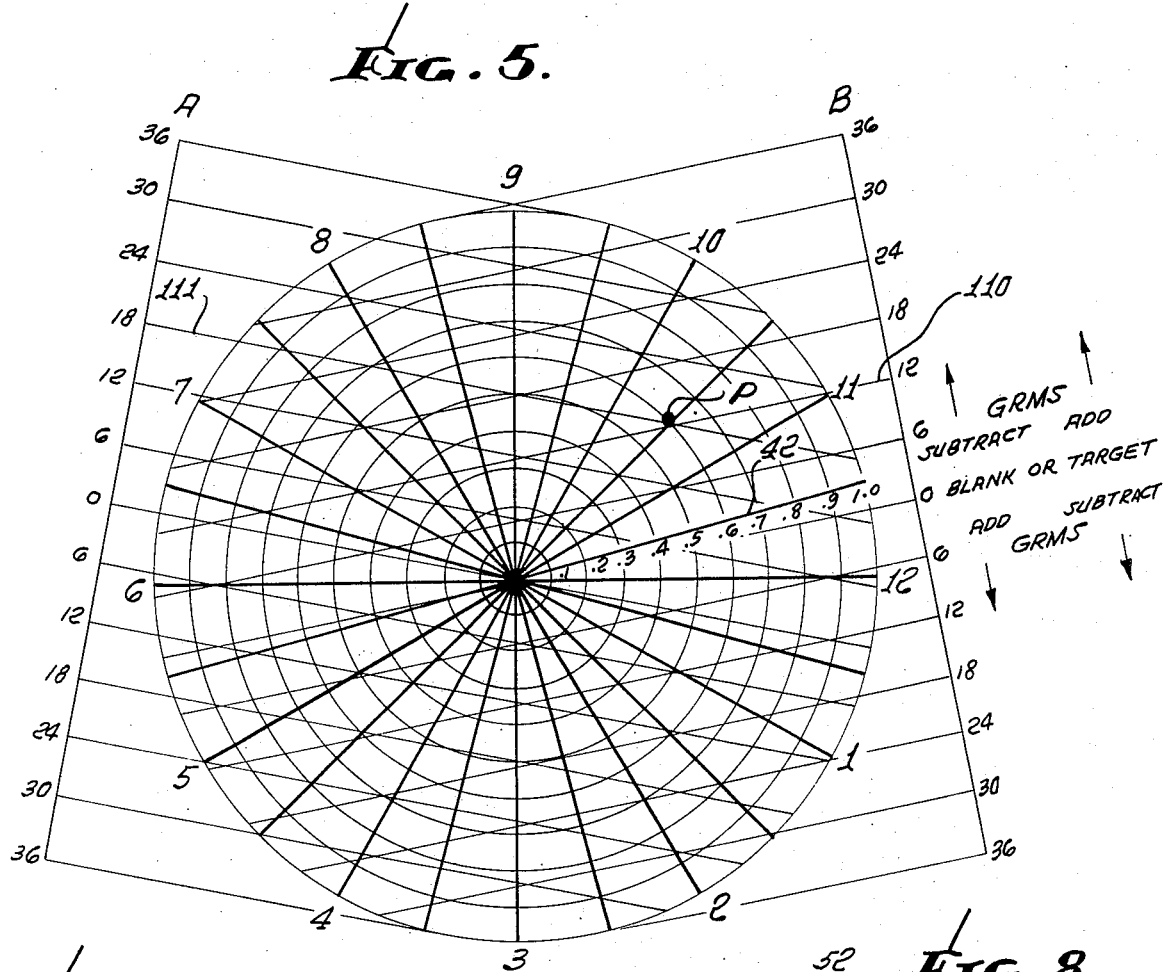
FIG. 5.
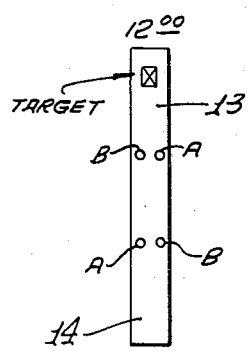
FIG. 6.
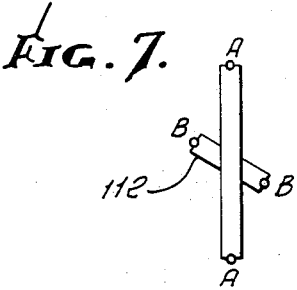
FIG. 7.
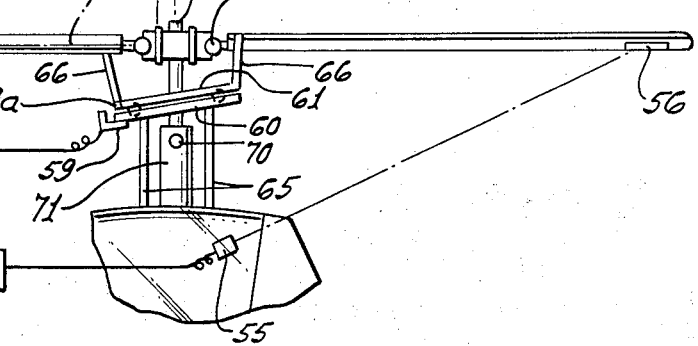
FIG. 8.
FIG. 9.

3,802,273

HELICOPTER ROTOR BALANCING METHOD AND SYSTEM

BACKGROUND OF THE INVENTION

This invention relates generally to dynamic balancing, on the helicopter, of rotors, and more particularly concerns method and apparatus for quickly and efficiently determining the amount of weight to be added to or subtracted from predetermined positions on the rotor.

It is a well known fact that a slight out of balance condition of a helicopter main rotor or tail rotor can cause roughness and vibration leading to premature wear and failure of the machine, and fatigue and annoyance of pilot and passengers. In the past, techniques used to correct out-of-balance in the field were crude, time consuming and inaccurate. For example, the mechanic would randomly add a weight to one of the several possible points of weight addition. The pilot and mechanic would hover the ship and try to judge whether the ship felt rougher or smoother; or the same. If rougher, the weight addition would be shifted to an opposite point; if then smoother, more weight would be tried (although it might really require less). If the same, another point would be tried. Generally, this would not lead to a smooth rotor, so weights would be added at another angular position, and the whole operation repeated. By repeating this procedure many times, vibration might be lessened, but the achievement of desired reduction was extremely unusual, because while the pilot could sense vibrational amplitude arising from rotor unbalance, he could not readily sense phase characteristics, and thus had no way of determining the locations for adding weights.

SUMMARY OF THE INVENTION

It is a major object of the invention to provide helicopter main rotor and tail rotor dynamic balancing method on the ship and apparatus characterized as enabling rapid and accurate balancing under field conditions.

Basically, the method involves the attachment of an accelerometer to helicopter structure proximate the rotor (main or tail) subject to oscillatory motion induced by rotor dynamic unbalance; operating the accelerometer to produce an electrical signal which is processed to derive a corresponding amplified output signal; triggering a stroboscope in synchronism with cyclic variations in the output signal and directing the stroboscope at the rotor to produce flashes repeatedly illuminating a target rotor blade at a characteristic angularity with respect to its axis of rotation; and, varying the weighting of the rotor as a function of the magnitude of the output signal and the target blade characteristic angularity to achieve substantial balance. As will be seen, the varying step may include establishing a multi-coordinate system, either analog or digital, characterized in that a first coordinate scale delineates peak values of the output signal, a second coordinate scale delineates values of target blade angularity about its axis of rotation, and other coordinate scale means delineates weight values to be added or subtracted to at least one predetermined position on the rotor, and further characterized in that any point in the system defined by particular coordinates on the first and second scales in turn defines particular weighting (on the other scale means) to be added or subtracted. Such first and second scales may define a polar coordinate system, and the other scale means may include two linear scales respectively associated with two sets of symmetric positions on the rotor, where weights are to be added or subtracted. A further important step consists in preliminarily adjusting the rotor blades to accurately track one another during rotary travel, as will be seen.

It is another object of the invention to provide apparatus to perform the steps or functions referred to, and also to enable determination of blade angularity without directing a stroboscope at the main rotor, which is oftentimes difficult under actual flight conditions.

These and other objects and advantages of the invention, as well as the details of illustrative embodiments, will be more fully understood from the following description and drawings, in which:

DRAWING DESCRIPTION

FIG. 1 is a side elevation of a helicopter tail rotor to be balanced;

FIG. 2 is a top plan view of the FIG. 1 rotor;

FIG. 3 is a block diagram of circuitry used in the balancing process;

FIG. 4 is a frequency response diagram;

FIG. 5 is a coordinate system graph;

FIG. 6 is another representation of the FIG. 1 tail rotor blade;

FIG. 7 is a representation of another tail rotor blade configuration;

FIG. 8 is a perspective showing of a hovering helicopter to which the invention is applicable;

FIG. 9 is an fragmentary elevation showing a helicopter main rotor head;

DETAILED DESCRIPTION

Figure 11:
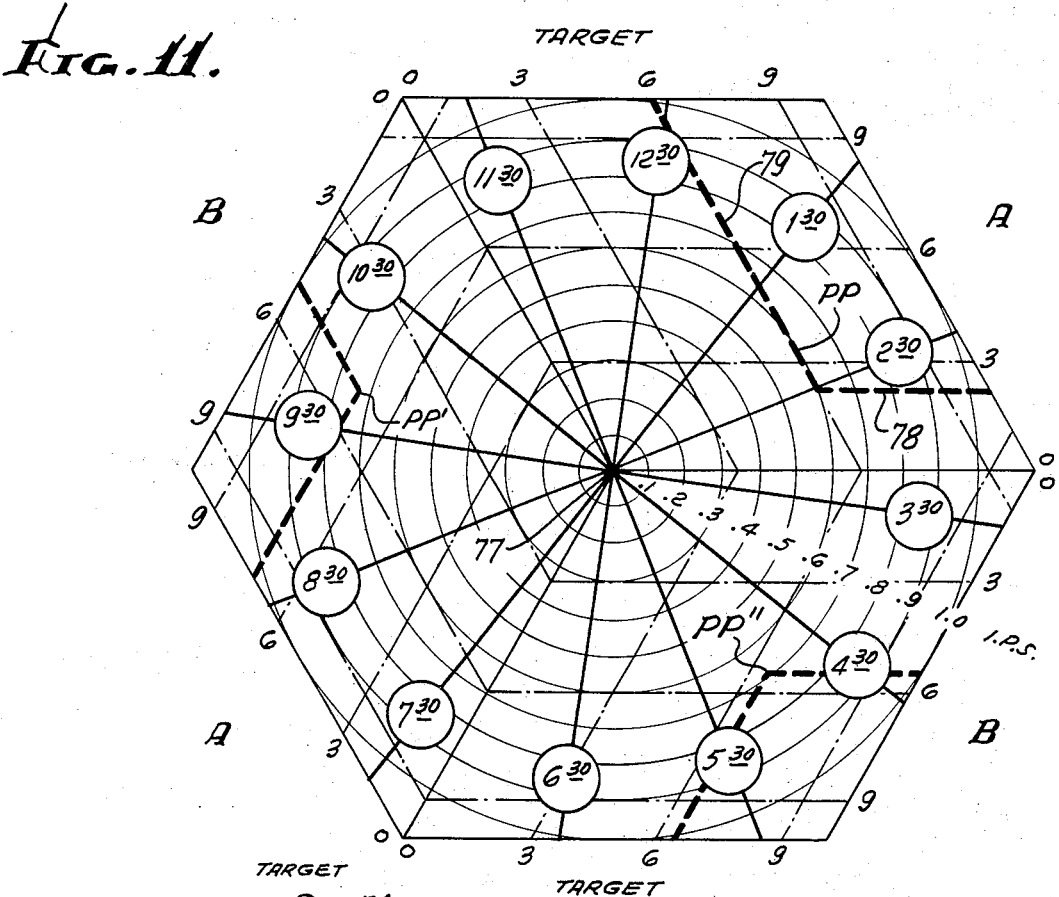
FIG. 11 is another coordinate system graph.

In the drawings, a helicopter rotor may take the form of the tail rotor 10 in FIGS. 1 and 2 carried by helicopter boom structure 11, and defining an axis of rotation 12. The rotor 10 may typically have multiple like blades such as are indicated at 13 and 14 extending diametrically oppositely from axis 12. Power is transmitted to the rotor as for example by shaft 15, right angular gearing in gear box 16, and stub shaft 17 to which the blades are attached as via grips 18 by means of which the pitch of the blades may be changed. Suitable fastener locations are indicated at 19, 20, 21 and 22. Locations 19 and 22 are symmetrically located at opposite sides of axis 12, and locations 20 and 21 are symmetrically located at opposite sides of axis 12. Also, locations 19 and 20 are at opposite sides of blade axis 23, as are locations 21 and 22, and axis 23 extends normal to axis 12. It should be noted that the exact mechanical detail of blade attachment, pitch change means, etc. varies greatly from helicopter type-to-type, as do the number of blades. These mechanical considerations dictate the possible locations for weight addition.

In accordance with the invention, a vibration pickup such as an accelerometer is attached to the helicopter structure proximate the rotor; and, in the example described an accelerometer 24 is shown attached to gear box 16. This instrument is operated to produce an output acceleration signal which is a function of oscillatory motion of the helicopter structure, as for example the boom structure 11, and which arises due to dynamic unbalance of the rotating rotor. Thus, the boom structure may undesirably vibrate in one or more directions, it being a prime purpose of the invention to significantly reduce or eliminate such vibration. Depending on structure, the vibration (motion) may be elliptical, or even circular. While the accelerometer is shown as attached to the gear box, it will be understood that it may be attached to other structure, so long as such structure is subject to rotor unblanace induced oscillatory motion which is to be reduced or eliminated. While an accelerometer has been referred to any transducer producing a cyclic output signal in response to structure vibrations may be used.

The vibration pickup output is typically an electrical signal varying in accordance with the vibration, and therefore constitutes an output signal. That signal is typically processed to produce a corresponding output signal to be used to operate a meter or other device to indicate amplitude, and to display phase and for triggering a stroboscope shown at 28 in FIGS. 2 and 3. For that purpose processing circuitry may be electrically connected between the accelerometer or pickup 24 and the stroboscope, and may advantageously include a band pass filter 29 and a trigger 35, these individually being well known components. The filter 29 has the dual functions of passing the accelerometer signal corresponding to the structure oscillation frequency to be reduced or eliminated (usually the fundamental), while rejecting other signals corresponding to other excitation frequencies, and also integrating the selected or passed signal to thereby produce an output velocity signal on lead 32. Filter 29 may be manually tuned, as by rotating knob 33, to select the frequency of the structure vibration to be reduced or eliminated; further, the filter may be "stagger tuned" to provide a rather broad range of pass frequencies as indicated between the limits $f_1$ and $f_2$ of response curve 36 in FIG. 4 rather than a narrow range of pass frequencies as indicated by the response curve 27 in that figure. A meter 39 in FIG. 3 indicates accelerometer velocity, as for example in inches per second, which may represent the maximum velocity of the boom structure as it vibrates back and forth. In this regard, and as will be seen, an important advantage in converting the maximum accelerometer output to a maximum velocity signal (rather than acceleration or displacement) lies in the fact that whereas displacement and acceleration outputs for acceptable vibration levels vary widely (as a function of rate or frequency and as for example between helicopter main rotor and tail rotor applications), velocity outputs for acceptable vibrations vary much less widely, and use of the latter for balancing purposes enables use of the same instrumentation, without "range changing," for all such applications.

The stagger tuned vs single tuned filter characteristic is used to verify tuning, for when the "verify tune" button is depressed, the filter converts from its stagger-tuned characteristic to single tuned. If the rate is not set in exact coincidence with the rotor rate, the amplitude and/or observed phase will change. Tuning is adjusted as required (front panel control) until there is no change when the button is pushed.

Trigger circuit 35 operates in response to occurrence of positive going zero crossing of the velocity signal on lead 32, for cyclically triggering the stroboscope 28 to which the trigger circuit is connected as via lead 40. An example of a known usable stroboscope STROBEX is Model 135M-9 or 135M-10, a product of Chadwick-Helmuth Co., Monrovia, California. The stroboscope is directed at the rotor, as in FIG. 2 for example, to produce flashes repeatedly illuminating a target blade (13 for example bearing target reflector 42) which appears relatively stationary at a "characteristic angularity" with respect to axis 12. This characteristic angularity is determined by the complex spring (of the supporting airframe) mass (of the rotor) system and the rotor rate. Each rotor of each helicopter type has a characteristic phase (or angularity) relation. Knowing such angularity, which may be expressed as "clock" position (blade 13 being shown at a 10:30 clock position in FIG. 1) and the magnitude of the maximum output velocity signal as it appears on meter 39, one may vary the weighting of the rotor to achieve substantial balance. In this regard, a small weight or weights may be added to or subtracted from the rotor at any of the fastener locations 19–22, the amount of such weighting change and the particular fastener locations at which the change is to be effected being determined by the reading on meter 39 and the clock position on the stroboscopically illuminated target blade. Accordingly, costly and time consuming trail and error weight change procedures are eliminated. Such weights may consist of washers to be added to or removed from threaded fasteners.

In accordance with a further important aspect of the invention, the determination of location and amount of rotor weighting may advantageously include the step of establishing a multi-coordinate system characterized in that:

a. a first coordinate scale delineates values of the velocity signal, b. a second coordinate scale delineates values of blade angularity (clock position) about its axis of rotation; and c. other coordinate scale means delineates weight values to be added or subtracted at at least one position on the rotor, and further characterized in that any point in the system or field defined by associated blade angle and velocity value coordinates in turn defines particular weighting to be added or subtracted at a position or positions on the rotor.

The referenced multi-coordinate system may be established in analog form (as for example graphic), tabular form, or in digital form (as for example in a digital computer memory). Thus, in FIG. 5 for example, a polar (analog) coordinate system is shown or established, with concentric circles delineating inches per second velocity values (.1 to 1.0), and "clock" angles or positions (1 to 12) from a selected radius 42 delineate values of stroboscopically stopped target blade angularity. The referred to other coordinate scale means delineating weight values takes the form, in FIG. 5, of two linear auxiliary scales represented as A and B, and respectively corresponding to or associated with predetermined A and B weight adding or subtracting positions on the rotor blades 13 and 14 seen in FIG. 6.

Thus, for any point in the coordinate system defined by particular blade angle and velocity value coordinates, there is associated or defined particular weighting to be added or subtracted at the referenced position or positions on the rotor. For example point "P" representing a stroboscopically stopped blade angle or clock position 10:30 and velocity value .6 inches per second on meter 39 in turn defines (via intercept line 110) a 12 gram weight to be added to the target blade 13 at the B position shown in FIG. 6 (or alternatively a 12 gram weight to be subtracted from the blank blade 14 at the symmetrical B position shown), and also an 18 gram weight (via intercept line 111) to be subtracted from the target blade 13 and A position shown in FIG. 6 (or alternately an 18 gram weight to be subtracted from the blank blade 14 at the symmetrical A position as shown). FIG. 7 illustrates another tail rotor configuration, with A positions at the blade tips, and B positions at the tips of a blade pitch control link 112 which rotates with the tail rotor, the chart for this configuration not being shown. In this regard, it should be noted that each rotor has certain locations, which will always be the same for that rotor type, at which weights may be added. The charts "reflect" the geometry of those possible points where weight may be added in relation to the rotor. Thus each rotor of each type of ship must have its own chart.

Using the above method, the helicopter tail rotor may be rapidly and accurately balanced with minimum cost and delay.

FIG. 8 illustrates application of the invention to balancing of a helicopter main rotor 50. Initially, the main rotor blades 51–54 are tracked to make sure that, as they rotate and pass through any given point in the azimuth, they are at the same level. Out-of-track condition causes roughness and vibration, affecting the balancing of the rotor unless removed prior to such balancing. Vibration and roughness arising from out-of-track conditions causes vertical and lateral vibration which masks the out-of-balance induced lateral vibration, making it impossible to distinguish the desired signal.

The condition of blade track is first observed with the ship operating as it will be during balancing, i.e. on the ground, or during hovering, as by aiming a stroboscopically operated light source 55 at the rotating blade tip path, the blade tip undersides carrying like retro-reflective targets 56. The latter reflect light from the beam 57 back toward the observer 58 inside the helicopter, who sees the bright targets in the sky. The blades are typically identified by target shape or color and any misaligned blade can be identified and the degree of misalignment judged. Thereafter, after the helicopter is at rest on the ground, the offending blade can be trim-adjusted back into alignment, as by means commonly provided at the rotor head 58'.

The light source 55 may comprise, for example, a STROBEX Model 135 M-9 or M-10 product of Chadwick-Helmuth Co., Inc., Monrovia, California. Its sync signal may be derived from a magnetic pick-up 59 secured to a fixed swashplate 60 (better seen in FIG. 9), the pick-up projecting near a swashplate 61 rotated by main drive shaft 62. Swashplate 61 carries a number of components (one for each blade) such as soft iron elements 59a, which magnetically actuate the pick-up to produce the sync signal, once for each blade passage. The sync signal is used to control the stroboscopic lamp 55. Tilt controls for the fixed swashplate are shown at 65 and operated to control pivoting of the rotating blades via pitch control links 66, to provide flight direction control of the helicopter as well as lift control.

After tracking is completed, dynamic balance of the main rotor may then be attained in a manner similar to that described above for the tail rotor. As shown in FIG. 9, an accelerometer 70 is attached to and near the top of the non-rotating mast 71 through which the main rotor drive shaft 62 passes, to detect lateral vibration of the mast arising from rotor dynamic unbalance. The accelerometer may be attached at a 9:00 o'clock position about the mast, 12:00 o'clock being forward. The accelerometer output is processed as in FIG. 3 to operate the stroboscope 28 which may be directed at the rotating rotor from the pilot's compartment in a manner similar to directing of stroboscope 55 in FIG. 8. The observed azimuth position at which the target is seen may jitter or be somewhat uncertain so it is advantageous to place the reflective target close to the blade roots, or on the hub. The target blade when illuminated may be located at any position about rotor main drive axis 73 depending upon the location of the imbalance.

Figure 10:
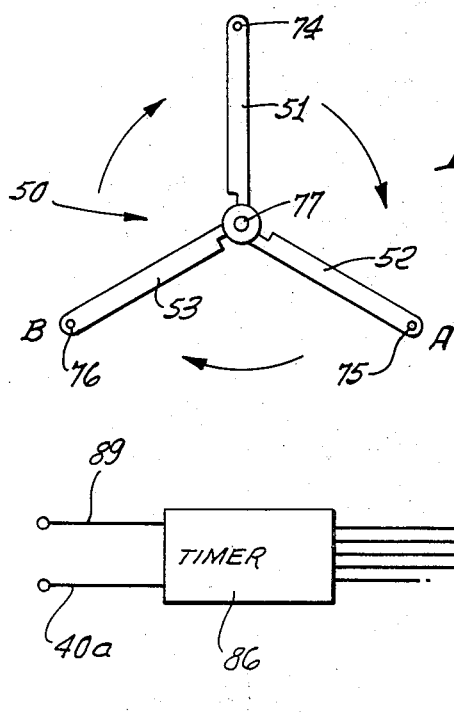
FIG. 10 is a plan view of a main rotor.

Assuming a main rotor 50 having three blades indicated as TARGET, A and B in FIG. 10, the latter may have fixed weight addition or subtraction positions indicated at 74–76. The determination of the amount of weight to be changed at any two of the three positions to overcome dynamic unbalance may be made with the aid of a multi-coordinate system as for example is shown in FIG. 11. As there seen, a first coordinate scale may be defined by concentric circles about center or pole 77, and identified by the i.p.s. (inches per second velocity output) number .1 to 1.0; and a second coordinate scale (delineating values of the angularity) is defined by the radial lines spaced apart at 30° intervals and identified by "clock positions" 12:30, 1:30 . . . 11:30. Other coordinate scale means delineating weight values to be added at at least two positions on the rotors are indicated at A, B and TARGET locations along hexagonal lines as shown.

In an example, assume a point PP representing a stroboscopically stopped target blade angle or "clock position" at 2:30, and also representing a velocity signal (derived from the accelerometer, as described) of about .6 inches per second. The two auxiliary scales applicable to this position are the A scale and TARGET scale at the top and top right of FIG. 11. As indicated, the corresponding intercept along line 78 on that A scale is approximately 2 weight values (grams, for example) to be added to the A blade at position 75, and the corresponding intercept along line 79 on that TARGET scale is approximately 5.8 weight values to be added to the TARGET blade at position 74, in FIG. 10. The intercept lines are parallel to the hexagonal scale lines A, B and TARGET in FIG. 11. Note that a point PP' would have intercepts on the A and B scales as shown, and that a point PP'' would have intercepts on the opposite TARGET and B scales, as shown. Also note that weights are to be added in every case, rather than subtracted.

Figure 12:
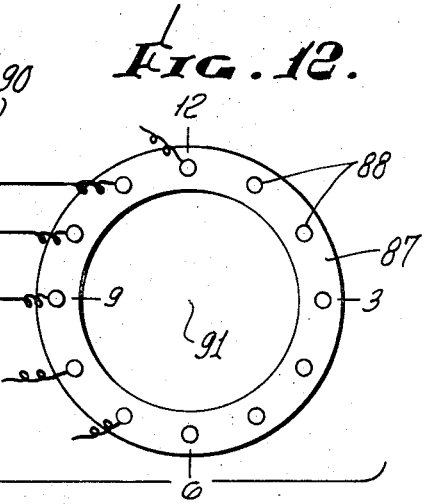
FIG. 12 is a light arrangement.

Finally, to obviate the difficulty of aiming the stroboscope 28 to the target blade in any position about axis 73, and auxiliary device 85 may be used as shown in FIG. 12. That device, such as Phazor Model 171, a product of Chadwick-Helmuth Co., Monrovia, California, may include a timer 86 and a ring 87 with lights or indicators 88 at equi-spaced angular intervals on the ring. The timer receives a sync signal once each revolution of the target blade 51, for example on line 89 to which the sync signal generator 59 may be connected. The timer is connected via leads 90 with all twelve (or other number) of lights 88 to turn them on in succession and in synchronism with the rotating "clock position" of the target blade; however, the timer also receives the trigger signal output on lead 40a as shown in FIG. 3. The timer only passes or gates an energizing signal to that light which is closest in synchronized position about axis 91 to the target blade position about axis 73 at the moment of trigger signal transmission. Accordingly, the operator may observe the angular clock position of the energized light or indicator, on the ring 87 in the pilot's compartment, and use the information as described above in the determination of blade weighting.

The compelling reason for the device 85 (the reason balance must be done in the air for some ships) is that the articulated (hinged) rotor systems have dampers (shock absorbers) in the lead-lag (azimuth) direction. Certain types of dampers have high static friction and don't allow the blade to adjust (by the effects of centrifugal force) to their desired equal spacing. If the ship is hovered, the necessary working of the controls, and loading of the blades "breaks" the static frictions and allows the blades to "phase" themselves properly. Thus balancing must be done from inside the ship where the device 85 is used.

The ship may be fitted with hardware to produce a sync signal for each blade passage to facilitate the blade tracking measurements. In this case, one of the sync signals (normally, the TARGET blade) is made a double pulse, and the device 85 includes logic to accept only the double pulse for the required one-per-rev.signal.

Because track and balance must be worked together, especially on main rotor, the instruments have been arranged to make this simple and quick to do. Tracking by the Strobex, as has been described, requires one signal per blade from the magnetic pickup, but phase determination by the device 85 requires only one signal per revolution. Logic is incorporated in the device 85 that will respond only to a "double pulse" with an interval of .5 to 5 millisecond, and will ignore all single pulses. The Strobex, however, has logic such that it responds only to the first pulse.

Thus by installing, on the rotating swashplate, one double interrupter with interval suitable to generate the appropriate double pulse, and the required number (n-1 for n blades) of single interrupters the signals (pulses) suitable for both track and balance are generated.

By simple front-panel selection then, either track or balance may be accomplished at will, making the operation very quick and simple.

Referring back to FIG. 9, each blade typically may have three axes of rotation designated as the pitch axis 95 extending generally parallel to the blade length, the articulation axis 96 extending generally horizontally and normal to axis 95, and vertical axis 97, suitable joints being provided to facilitate blade rotation about such axes.

We claim:

1. In the method of balancing a rotor having multiple blades and defining an axis of rotation, and wherein structure proximate the rotor is subject to vibratory motion due to dynamic unbalance of the rotating rotor, the method employing a vibration pickup and a stroboscope, the method including:

a. attaching the pickup to said structure, operating the pickup to produce a vibration signal which is a function of said oscillatory motion, and processing said signal to produce a corresponding oscillatory output signal, b. triggering the stroboscope in synchronism with said output signal and directing the stroboscope at the rotor to produce flashes repeatedly illuminating a target rotor blade at a characteristic angularity with respect to said axis, c. varying the weighting of the rotor as a function of the magnitude of said signal and said characteristic angularity to achieve substantial balance, and d. said processing including subjecting the vibration signal alternately to relatively wide and relatively narrow frequency band filtering, and also varying the center frequency of said narrow band filtering while observing any changes in said characteristic angularity of the blade until said characteristic angularity remains fixed.

2. The method of claim 1 wherein said varying step includes establishing a multi-coordinate system characterized in that a first coordinate scale delineates values of said signals, a second coordinate scale delineates values of said target blade angularity about said axis, and other coordinate scale means delineates weight values to be added or subtracted at at least one predetermined position on the rotor, and further characterized in that any point in the system defined by particular blade angle and signal value coordinates in turn defines, by reference to said other scale means, particular weighting to be added or subtracted as defined.

3. The method of claim 2 wherein said system establishment step includes the establishment of a polar coordinate system wherein concentric circles delineate values of said signals, and angles from a predetermined radius to said circles delineate values of said blade angularity.

4. The method of claim 2 wherein said system establishment step is characterized by establishment of at least two scales delineating said weight values, one of said two scales associated with one predetermined position on the rotor, and another of said two scales associated with another predetermined position on the rotor.

5. The method of claim 1 wherein the stroboscope is directed at a helicopter tail rotor and the pickup is attached to helicopter tail structure.

6. The method of claim 1 wherein the stroboscope is directed at a helicopter main rotor and the pickup is attached in proximity to the main rotor mast.

7. The method of claim 6 including the step of adjusting the rotor blades to accurately track one another during rotary travel.

8. In the method of balancing a helicopter rotor having multiple blades and defining an axis of rotation, and wherein structure proximate the rotor is subject to oscillatory motion due to dynamic unbalance of the rotating rotor, the method employing circuitry including a transducer that includes a. attaching the transducer to said structure, and operating said circuitry to produce a signal which is a function of said oscillatory motion, b. using said signal to determine the characteristic angularity of one of said blades about said axis once each cycle of said signal, and c. varying the relative weighting of the rotor at preselected angularly offset and radially fixed locations as a function of the magnitude of said signal and of said characteristic angularity.

9. The method of claim 8 wherein said characteristic angularity determination is carried out using a ring of indicators subject to successive energization in synchronism with rotor rotation, and gating the energization of only that indicator whose angular position most closely corresponds to the characteristic angularity of said one blade.

10. For combination with a helicopter rotor having multiple blades and defining an axis of rotation and helicopter structure proximate the rotor subject to vibratory motion due to dynamic imbalance of the rotating rotor, apparatus comprising
   a. a vibration pickup attachable to said structure to produce an output signal which varies as a function of said vibratory motion, and circuitry for processing said signal to produce a cyclic signal, and
   b. means responsive to said cyclic signal for determining the characteristic angularity of one of said blades about said axis once each cycle of said signal,
   c. whereby the weighting of the rotor may be varies as a function of the magnitude of said cyclic signal and of said characteristic angularity, to achieve substantial dynamic balance of the rotor,
   d. said circuitry including a band pass filter receiving the pickup output signal and producing a velocity output signal which constitutes said cyclic signal, the filter including means to rapidly convert between relatively wide and relatively narrow frequency band tuned conditions and also to vary the center frequency of said narrow band filtering so that observed variations in said characteristic angularity may be eliminated.

11. The apparatus of claim 10 including said helicopter structure to which the pickup is attached.

12. The apparatus of claim 11 wherein said helicopter structure is located proximate the helicopter tail rotor.

13. The apparatus of claim 11 wherein said helicopter structure is located proximate the helicopter main rotor.

14. The apparatus of claim 10 wherein said means includes a stroboscope directed at the rotor and triggered by said cyclic signal.

15. The apparatus of claim 10 wherein said means includes a ring of indicators subject to successive energization in synchronism with rotor rotation, and timing means for gating the energization of only that indicator whose angular position relative to the ring most closely corresponds to the characteristic angularity of said one blade.

16. The apparatus of claim 10 including a multi-coordinate system characterized in that a first coordinate scale delineates values of said output velocity signal, a second coordinate system delineates values of said target blade angularity about said axis, and other coordinate scale means delineates weight values to be added or subtracted at at least one predetermined position on the rotor, and further characterized in that any point in the system defined by particular blade angle and velocity value coordinates in turn defines, by reference to said other scale means, particular weighting to be added or subtracted as defined.

* * * * *